United States Patent [19]
Fortmann et al.

[11] Patent Number: 5,087,364
[45] Date of Patent: Feb. 11, 1992

[54] LIQUID CONTROL ASSEMBLY

[75] Inventors: Robert C. Fortmann, Mundelein; Curtis C. Pinnow, Libertyville; Louis Porcaro, Orland Park, all of Ill.

[73] Assignee: Carter-Hoffmann Corp., Mundelein, Ill.

[21] Appl. No.: 414,326

[22] Filed: Sep. 29, 1989

[51] Int. Cl.$^5$ .............................................. B01D 35/02
[52] U.S. Cl. ..................................... 210/390; 210/429; 210/459; 210/497.01
[58] Field of Search ..................... 210/390, 429–432, 210/459–463, 482, 497.01

[56] References Cited

U.S. PATENT DOCUMENTS

| | | | |
|---|---|---|---|
| 868,255 | 10/1907 | Disbrow | 210/390 X |
| 1,135,900 | 4/1915 | Hughson | 210/459 X |
| 1,613,166 | 1/1927 | Gregory | 210/429 |
| 2,886,128 | 5/1959 | Ralys | 210/429 X |
| 3,061,104 | 10/1962 | Schaffner | 210/459 X |
| 3,217,887 | 11/1965 | Meister | 210/482 X |
| 4,363,727 | 12/1982 | Bonifacio | 210/96.1 |
| 4,479,875 | 10/1984 | Nelson | 210/462 X |
| 4,734,194 | 3/1988 | Kalman et al. | 210/390 |
| 4,743,365 | 5/1988 | Noland | 210/390 X |

FOREIGN PATENT DOCUMENTS

| | | | |
|---|---|---|---|
| 601368 | 8/1934 | Fed. Rep. of Germany | 210/460 |
| 434188 | 8/1935 | United Kingdom . | |

*Primary Examiner*—Robert Spitzer
*Attorney, Agent, or Firm*—Wood, Phillips, Mason, Recktenwald & VanSanten

[57] ABSTRACT

A liquid control assembly consisting of: a housing having a top and bottom, a chamber, a drain conduit having an entryway in the chamber and communicating between the chamber and a discharge point, and a delivery conduit having an entryway in the chamber and communicating between the chamber and a point of use; and structure for selectively blocking the drain conduit entryway and for thereby diverting liquid in the chamber to the delivery conduit.

22 Claims, 2 Drawing Sheets

LIQUID CONTROL ASSEMBLY

BACKGROUND OF THE INVENTION

1. Field of the Invention

This invention relates to liquid flow controls and, more particularly, to a unitary control assembly that selectively a) directs liquid from a supply to a drain and b) filters and directs liquid from the supply to a point of use.

2. Background Art

Devices in many diverse fields require the delivery thereto of metered amounts of water from a supply. One exemplary device is a humidified food treatment cabinet, such as that shown in U.S. Pat. No. 4,835,368, the subject matter of which was co-invented by two of the inventors herein.

The food treatment cabinet in U.S. Pat. 4,835,368 has a reservoir 72 with a heated bottom wall 74 against which metered amounts of water are pulsed at controlled time intervals to produce a desired humidity content within the food treatment/holding space 12 bounded by the cabinet.

To produce a consistent and predictable environment within the cabinet, it is important that the same amount of water be delivered by each pulse against the heated wall 74. This may not occur if there are impurities or debris in the water supply. Even if the contamination in the water is relatively insignificant, over a substantial time period, there is a cumulative buildup of foreign matter that may restrict conduit openings and thereby alter the liquid flow characteristics.

One solution to the above problem has been to place a fine mesh stainless steel filter at the bottom of liquid supply/reservoir tanks 90. However, cleaning and/or changing of the filter is a relatively difficult operation and thus a nuisance to the operator. Because of the inconvenience, the filters are inevitably left in longer than is practical and resultingly the operation of the device is compromised.

As a result of the inconvenience of the filter and the problem of its frequent clogging, it is not uncommon for users of the device to remove the filter altogether, thereby allowing debris to flow unimpeded through the system.

Another problem with conventional screen filters is that the filters are generally relatively small, increasing the likelihood that they may be lost and/or misplaced.

A still further problem is that a conventional screen filter may shift relative to the opening which it covers, leaving space for foreign matter to migrate through the system. This problem also must be contended with when the filter is cleaned. Upon the filter being removed for cleaning or replacement, foreign matter that is not trapped in the filter can flow freely into the system.

A still further problem with prior art reservoirs is that they generally require entirely separate and thus relatively complicated structures to both drain and deliver liquid from the reservoir to a point of use.

SUMMARY OF THE INVENTION

The present invention is specifically directed to overcoming the above-enumerated problems in a novel and simple manner.

According to the invention, a liquid control assembly is provided and consists of: a housing having a top and bottom, a chamber, a drain conduit having an entryway in the chamber and communicating between the chamber and a discharge point, and a delivery conduit having an entryway in the chamber and communicating between the chamber and a point of use; and structure for selectively blocking the drain conduit entryway and for thereby diverting liquid in the chamber to the delivery conduit.

In one form of the invention, the delivery conduit entryway is above the drain conduit entryway and the blocking structure consists of a drain plug with a seal for covering the drain conduit entryway.

One of the objectives of the present invention is to provide a structure wherein liquid flows normally into the drain conduit in the absence of the drain plug. Once the seal covers the drain conduit entryway, the liquid level in the chamber rises to the height of the delivery conduit entryway for passage therethrough. The flow of liquid thus depends on the presence or absence of the drain plug, which can be simply assembled into operative position on the housing.

Another object of the invention is to prevent unfiltered liquid from passing through the delivery conduit, thereby protecting lines and equipment supplied by that conduit.

To accomplish this end, the drain plug is configured to fit in an opening in the housing and in communication with the chamber. The drain plug has an elongate stem with opposite ends and an opening to guide flow from a supply into the chamber. The filter is positioned around the stem and intercepts the entire flow volume communicating from the plug opening to the delivery conduit. In the absence of the drain plug, the liquid in the chamber goes directly through the drain conduit. Once the drain plug is in place, all liquid entering the chamber flows through the filter so that unfiltered water cannot flow into the delivery conduit.

In a preferred form, the drain plug has an elongate stem, with the seal at one end thereof and an enlarged head at the other end, to facilitate manipulation thereof. Cooperating ramp surfaces are provided on the plug and housing. By engaging the ramp surfaces and rotating the drain plug relative to the housing, the cooperating ramp surfaces cause the drain plug seal to be biased against the housing to thereby deform the seal to positively block the entryway to the drain conduit.

Preferably, the housing is formed in two parts, which are joinable as by cooperating threads, to capture a support wall for the liquid control assembly.

The inventive drain plug is readily assembled and disassembled. Securing of the plug involves properly locating it in the housing and affecting a partial turn to snug the seal against the housing due to the wedging action from the cooperating ramp surfaces. Manipulation of the drain plug is facilitated by the enlarged head thereon. The drain plug is sufficiently large that it is not likely to be lost or easily damaged, yet it is not so large as to be difficult to operate.

Another advantage of the present invention is that the filter is designed to capture impurities screened thereby. Preferably, a cylindrical filter element, such as a metal screen, surrounds the stem. All the impurities captured by the filter are retained within the cylindrical space internally of the cylindrical screen so that removal of the drain plug does not permit the escape of the captured impurities in the vicinity of the housing opening from where they might otherwise flow into the delivery conduit.

Overall, the inventive system accomplishes numerous functions by a relatively simple structure.

DETAILED DESCRIPTION OF THE DRAWINGS

Figure 1:
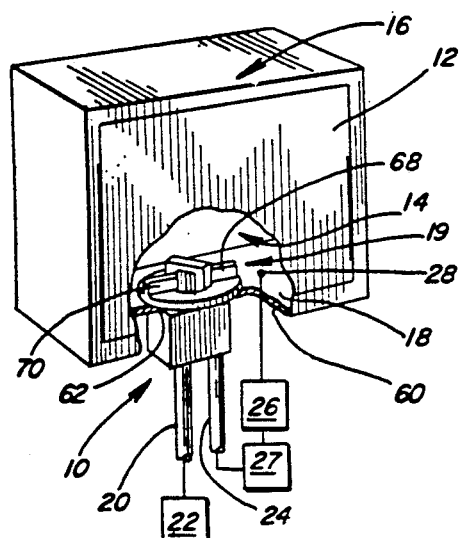
FIG. 1 is a perspective view of a device partially broken away to reveal an assembled liquid control assembly according to the present invention.
Figure 2:
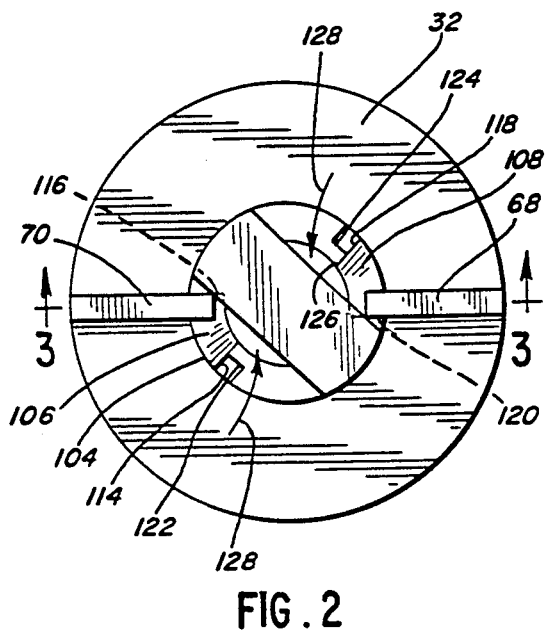
FIG. 2 is a plan view of the liquid control assembly of FIG. 1.
Figure 4:
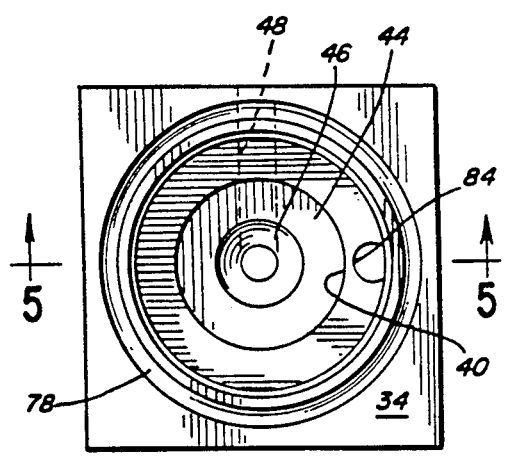
FIG. 4 is a plan view of the lower part of a two-part housing on the liquid control assembly.
Figure 3:
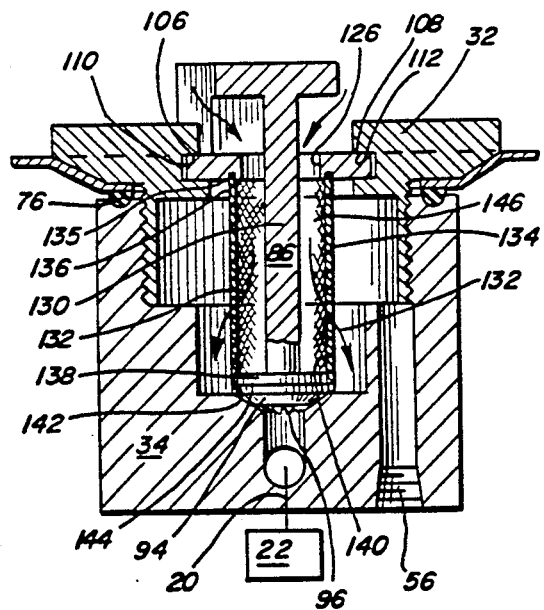
FIG. 3 is a section view of the liquid control assembly taken along line 3—3 of FIG. 2.
Figure 5:
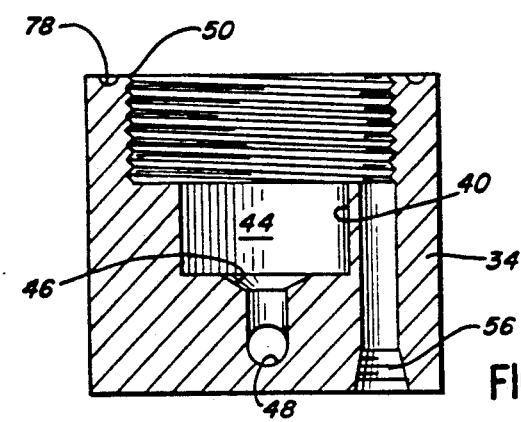
FIG. 5 is a section view of the lower housing part taken along line 5—5 of FIG. 4.
Figure 6:
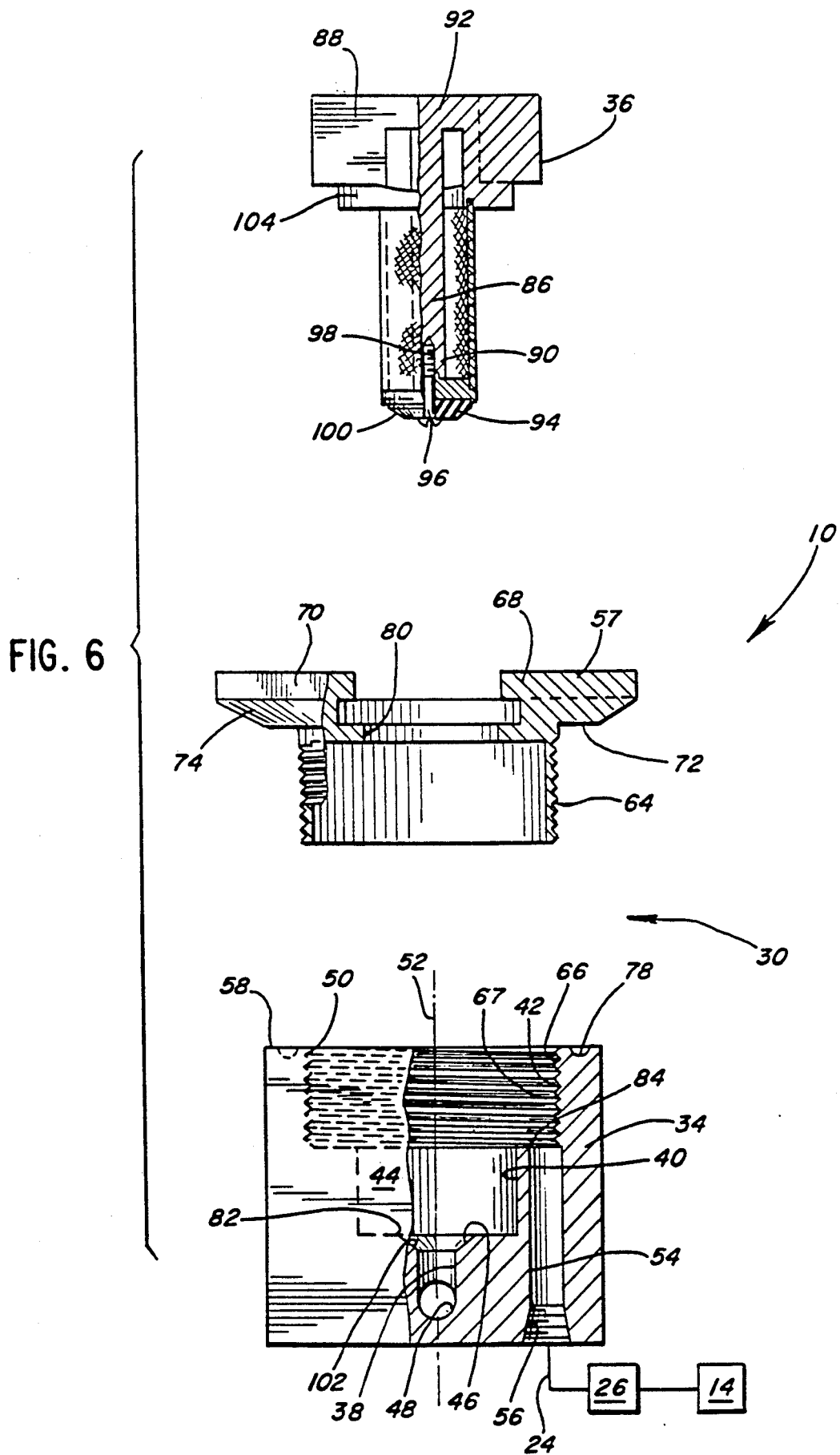
FIG. 6 is an exploded, elevation view of the liquid control assembly of FIG. 1.

In FIG. 1, a preferred form of liquid control assembly is shown at 10 operatively associated with a cabinet 12, shown schematically and generically representing apparatus with which the control assembly 10 can be utilized. For example, the cabinet 12 can be a humidified food treatment cabinet, such as that disclosed in U.S. Pat. 4,835,368, to Fortmann et al.

The cabinet 12 has an internal treatment space 14 bounded by a wall structure 16, which includes a sheet metal bottom wall 18 defining a collection reservoir 19 for a supply of liquid to flow through the control assembly 10.

Typically, the reservoir 19, with which the control assembly 10 is associated, has a drain conduit 20, preferably of stainless steel, for direction of liquid in the reservoir 19 to a discharge point, shown schematically at 22 in FIG. 1. A delivery conduit 24, also preferably of stainless steel, directs liquid from the reservoir 19 to a point of use, shown at 26 in FIG. 1. The point of use 26 may be a heated wall, such as that in U.S. Pat. 4,835,368, with delivery of liquid thereto being regulated by a solenoid 27. The wall 26 causes vaporization of the liquid, which vapor then diffuses from a point 28 within the cabinet 12 throughout the treatment space 14.

Conventionally, the drain and delivery conduits, 20, 24 respectively, are independently associated with the cabinet 12. The present invention affords a single assembly 10, which performs both the drain and delivery functions by a relatively simple structure. The details of the control assembly 10 are shown in FIGS. 1-6.

The control assembly 10 consists generally of a two-part housing 30, with an upper housing part 32 and a lower housing part 34. The housing 30 cooperates with a removable drain plug 36. The lower housing part takes a generally squared configuration and is formed preferably from machined polycarbonate. The lower housing part 34 has three concentric bores 38, 40, 42 of progressively increasing diameter, which produce a stepped liquid chamber 44. A tapered bore 46 communicates between the chamber 44 and the bore 38. A bore 48 at right angles to the bore 38 communicates between the bore 38 to externally of the housing part 34. Where the bore 48 is exposed externally of the housing part 34, a threaded receptacle (not shown) can be formed to connect the end of the conduit 20 so as to define a continuous communication path between the opening 50 at the top of the chamber 44 and the discharge point 22.

Radially offset from the axis 52 of the bores 38, 40, 42 is a separate bore 54, which defines a communication path between the chamber 44 and the delivery conduit 24. A threaded receptacle 56 is defined at the bottom of the bore 54 to accept a male pipe fitting (not shown) to connect the end of conduit 24 to the housing part 34.

The housing part 34 is connected to the bottom wall 18 of the cabinet 12 by a flange nut 57. The upper surface 58 of the housing part 34 is facially engaged with the flat underside surface 60 on the cabinet wall 18 so that the opening 50 on the housing part 34 aligns with an opening 62 in the wall 18. The opening 62 has substantially the same diameter as the opening 50 in the housing part 34. A threaded body 64 on the flange nut 57 is directed through the wall opening 62 and mated with threads 66 on the wall surface 67 surrounding the bore 42.

Flanges 68, 70, projecting upwardly from the body 64, facilitate rotation of the housing part 32 relative to the housing part 34. With the housing part 32 screwed firmly into place, the wall 18 of the cabinet 12 is held captively between the flat underside surface 72 on an enlarged rim 74 on the housing part 32 and the upper surface 58 of the housing part 34. A resilient O-ring 76 is provided in an annular seat 78 formed in the upper surface 58 of the housing part 34 and compresses between the housing part 34 and underside 60 of the wall 18 to establish a leakproof connection therebetween. The entire housing 30 is thereby held positively on the cabinet wall 18.

With the parts 32, 34 of the housing 30 assembled, a flow path for liquid in the reservoir 19 is defined consecutively through a reduced diameter opening 80 in the housing part 32, the chamber 44, an entryway 82 associated with the bore 38, bore 38, bore 48 and conduit 20.

The entryway 84 to the bore 54 and conduit 26 is above the entryway 82 to the conduit 20. The result is that liquid flowing through the opening 80 and into the chamber 44 flows freely through the bores 38, 48 and into the conduit 20 at a sufficient rate that the liquid does not accumulate in the chamber 44 to a height equal to the height of the entryway 84 to the conduit 24. In the absence of the drain plug 36, the liquid from the reservoir 19 in the cabinet 12 flows freely to the discharge point 22.

The drain plug 36 is configured to block the entryway 82 to the conduit 20 to thereby permit buildup of liquid in the chamber 44 to a height above the entryway 84, whereupon the water flows into the bore 54 and communicates to and through the conduit 24. The result is that with the conduit 20 blocked all flow is diverted to the conduit 24 for delivery to the point of use 26 and ultimately to the cabinet treatment space 14, with the device described in FIG. 1.

The drain plug 36 has an elongate stem 86 with an enlarged head 88 at one end thereof, to facilitate manipulation of the drain plug 36. At the end 90 of the stem, opposite the end 92 on which the head 88 is provided, a resilient seal 94 is attached through a bolt 96 extending lengthwise into a threaded bore 98 in the stem end 90. The seal has a tapered annular surface 100 which matches the tapered surface 102 defined by the bore 46. With the drain plug 36 in its operative position of FIG. 3, the seal 94 blocks the passage of liquid into the bore 38 and conduit 20.

The stem 86 has a radially enlarged flange 104 with diametrically opposed, upwardly facing ramp surfaces 106, 108, which respectively cooperate with oppositely facing ramp surfaces 110, 112 on the underside of the flanges 70, 68, respectively, on the flange nut 57. The ramp surface 106 progressively tapers upwardly from a lower edge 114 to an upper edge 116, and the ramp surface 108 progressively tapers upwardly from a lower edge 118 to an upper edge 120. Diametrically opposed cut-outs 122, 124 in the flange 104 are dimensioned to match the configuration of the flanges 68, 70 so as to allow passage of the drain plug flange 104, without any interference, downwardly beneath the ramp surfaces 110, 112, on the housing part 32. The seal 94, in this position, maintains the plug 36 slightly higher than is required in this position to engage the ramp surfaces 106, 108, 110, 112. By exerting a slight downward force on the plug 36, the seal 94 is compressed sufficiently that the plug 36 can be rotated counterclockwise relative to the housing 30 to the FIG. 2 position, whereupon the cooperating ramp surfaces 106, 108, 110, 112 cause the seal 94 to be maintained biased against the seat therefore defined by the tapered surface 102.

With the plug 36 in place, flow of liquid into the chamber 44 occurs through a reduced diameter opening 126 in the plug flange 104. The incoming liquid, flowing in the directions of arrows 128, is funneled towards the stem body 130 on the plug 36. The liquid then disperses radially outwardly into the chamber 44 as indicated by arrows 132.

The invention contemplates preferably that all liquid coming into the chamber 44 be filtered so that impurities cannot flow into the conduit 24. To accomplish this, a cylindrical filter element 134 is fit on the plug 36. The filter 134 may be stainless steel mesh or other suitable material. The plug flange 104 has an annular undercut 135 to closely seat the upper edge 136 of the filter 134. At the lower end of the plug stem 86 is a radially enlarged filter support element 138 which has a diameter closely matched to the inside diameter 140 of the filter 134. To assemble and/or replace the filter 134, the seal 94 is initially removed by loosening the bolt 96. The filter 134 is then slid upwardly over the support element 38 until the upper filter edge 136 nests in the undercut 135. With the filter edge 136 fully seated in the undercut 135 on the flange 104, the lower filter edge 142 is co-planar with the bottom flat surface 144 of the filter support element 138. The replacement of the seal 94 captively maintains the filter 134 against the flange 104.

To disassemble the plug 36, a partial turn thereof disengages the ramp surfaces 106, 108, 110, 112 and aligns the cutouts 122, 124 on the plug 36 with the flanges 68, 70 to permit upward movement of the plug 36 relative to the housing 30. The plug can be reinstalled by reversing the operation and affecting a small turn of the plug 36 to positively seat the same. The plug 36, while being easily manipulated, is large enough that it is not readily susceptible to being lost. At the same time, removal of the drain plug effects rapid draining of the reservoir 44.

Because the liquid flows out of the filter 134, impurities strained by the filter 134 are accumulated within the space 146 bounded by the filter 134. Consequently, removal of the drain plug 36 does not allow any of the impurities to escape. Cleaning of the filter can thus be accomplished safely away from the housing 30.

The foregoing disclosure of specific embodiments is intended to be illustrative of the broad concepts comprehended by the invention.

We claim:

1. A liquid control assembly comprising:
   a housing having a chamber, the housing defining a) a drain conduit for directing liquid from the chamber to a discharge point, b) a delivery conduit for directing liquid from the chamber to a point to use, wherein the chamber is in communication with each of said drain conduit and delivery conduit;
   a drain plug;
   first cooperating means on said drain plug and housing for selectively placing said drain plug in first and second positions relative to the housing; and
   second cooperating means on said drain plug and housing for blocking flow of liquid from said chamber into said drain conduit, said drain plug directing liquid flow from a supply into said chamber, and into said delivery conduit with said drain plug in said first position,
   said drain plug in said second position permitting flow of liquid from a supply through the chamber into said drain conduit.

2. The liquid control assembly according to claim 1 wherein liquid flows by gravity from a supply into said housing chamber, each said drain and delivery conduit having a liquid entryway communicating with said chamber, said delivery conduit entryway being above the drain conduit entryway so that liquid must be above a predetermined height in said chamber to flow through said delivery conduit entryway and into the delivery conduit and with said drain plug in said first position liquid from a supply can be directed into the chamber and accumulate to a height above said predetermined height.

3. The liquid control assembly according to claim 2 wherein said housing has an opening communicating between a supply and said chamber, the drain plug in said first position fitting in said housing opening and defining a flow path from a supply to said chamber, said drain plug having means for filtering liquid moving in said flow path from a supply into said chamber.

4. The liquid control assembly according to claim 3 wherein said filtering means has a cylindrical filter element defining an internal cylindrical space and liquid moving in said flow path flows from a supply into said internal cylindrical space and radially outwardly through said filter element so that impurities and the like blocked by said filter element accumulate in said internal cylindrical space.

5. The liquid control assembly according to claim 2 wherein said drain plug has an elongate stem with spaced ends, one said stem end has a head for manipulating the drain plug and the other stem end has a seal for blocking the entryway to the drain conduit with the drain plug in its first position, said housing has an opening communicating between a supply and said chamber and said drain plug extends through the opening so that the seal blocks the drain conduit with the drain plug in its first position.

6. The liquid control assembly according to claim 5 wherein said drain plug has an opening communicating between supply and said housing chamber, there is a filter element surrounding the drain plug stem and liquid from a supply flows through said drain plug opening and filter element into said chamber.

7. The liquid control assembly according to claim 5 wherein said housing defines a seat surrounding the entryway to the drain conduit, said seal engages said seat to block the entryway to the drain conduit and cooperating means are provided for biasing the seal against the housing seat with the drain plug in the first position.

8. The liquid control assembly according to claim 7 wherein said seal has a resilient surface that is borne against the housing seat by the cooperating biasing means.

9. The liquid control assembly according to claim 7 wherein said cooperating biasing means comprises cooperating ramp surfaces on the housing and drain plug and a bias force is selectively increased and diminished by rotating the drain plug relative to the housing with the ramp surfaces on the drain plug and housing against each other.

10. The liquid control assembly according to claim 1 wherein said drain plug has means for filtering liquid flow from a supply into said delivery conduit.

11. The liquid control assembly according to claim 1 wherein said housing comprises first and second parts and cooperating means on the first and second parts for releasably joining said first and second parts so as to captively engage a support for said liquid control assembly.

12. The liquid control assembly of claim 1 wherein said drain plug includes an integrally-formed inlet which directs liquid from a supply through said inlet into said chamber and said delivery conduit when said drain plug is in said first position.

13. The liquid control assembly of claim 12 wherein liquid from a supply flows through said inlet in said drain plug when said drain plug is in said second position.

14. A liquid control assembly comprising:
a housing having a top and bottom, a chamber, a drain conduit having an entryway in said chamber and communicating between said chamber and a discharge point and a delivery conduit having an entryway in said chamber and communicating between said chamber and a point of use; and
means having an integrally formed inlet for selectively blocking said drain conduit entryway while allowing liquid from a supply to enter into said inlet and into said chamber and for diverting liquid from said chamber to said delivery conduit with said drain conduit entryway blocked.

15. The liquid control assembly of claim 14 wherein said delivery conduit entryway is above said drain conduit entryway and said blocking means comprises a drain plug with a seal for covering said drain conduit entryway and cooperating means are provided on the drain plug and housing for selectively biasing the drain plug seal against the housing to thereby block the drain conduit entryway, whereby with said drain conduit entryway blocked, liquid level in the chamber rises to the height of the drain conduit entryway for flow therethrough to a point of use.

16. The liquid control assembly of claim 14 wherein said blocking means has an elongate stem with opposite ends, there is a seal on one end of the stem for bearing against the housing to block the drain conduit entryway and there is an enlarged head on the other end of the stem.

17. The liquid control assembly of claim 14 wherein there is an opening in said housing communicating with said chamber, said blocking means extends through said housing opening and defines a flow path for liquid entering said chamber.

18. The liquid control assembly of claim 17 wherein said blocking means has an opening through which liquid flows in entering said chamber and filter means are provided to intercept substantially all liquid that passes through said blocking means opening into said chamber.

19. The liquid control assembly of claim 14 wherein liquid from a supply flows through said inlet in said blocking means when said drain conduit is blocked.

20. A liquid control assembly comprising:
a housing having a top and bottom, a chamber, a drain conduit having an entryway in said chamber and communicating between said chamber and a discharge point and a delivery conduit having an entryway in said chamber and communicating between said chamber and a point of use; and
means for selectively blocking said drain conduit entryway and for thereby diverting liquid in said chamber to said delivery conduit,
wherein said blocking means has an elongate stem with opposite ends, there is a seal on one end of the stem for bearing against the housing to block the drain conduit entryway and there is an enlarged head on the other end of the stem,
wherein said stem has an enlarged flange between the ends thereof with a ramp surface thereon, there is a ramp surface on the housing and the ramp surfaces on the blocking means and housing are engageable with each other and cooperate to bias the seal against the housing to block the drain conduit entryway upon said blocking means being rotated relative to the housing with the ramp surfaces engaged.

21. A liquid control assembly comprising:
a housing defining a) a drain conduit having an entryway and an exit, the entryway being located above the exit, the drain conduit directing liquid from a supply to a discharge point, b) a delivery conduit having an entryway and an exit, the entryway being located above the exit, the delivery conduit directing liquid from a supply to a point of use, and c) a chamber in communication with each said drain conduit and delivery conduit;
a drain plug;
first cooperating means on said drain plug and housing for selectively placing said drain plug in first and second positions relative to the housing; and
second cooperating means on said drain plug and housing for blocking flow of liquid from a supply through said chamber into said drain conduit and for allowing liquid flow from a supply into said chamber and for diverting liquid from a supply into said delivery conduit with said drain plug in said first position,
said drain plug in said second position permitting flow of liquid from a supply through the chamber into said drain conduit, and wherein liquid flows by gravity from a supply into said housing chamber.

22. A liquid control assembly comprising:
a housing having a top and bottom, a chamber, a drain conduit having an entryway and an exit, said entryway being located above said exit, said entryway in said chamber and communicating between said chamber and a discharge point and a delivery conduit having an entryway and an exit, said entryway being located above said exit, said entryway being located in said chamber and communicating between said chamber and a point of use; and
means for selectively blocking said drain conduit entryway while allowing liquid from a supply to enter into the chamber and for diverting liquid in said chamber to said delivery conduit with said drain conduit entry blocked and wherein liquid can flow by gravity from a supply into said housing chamber.

* * * * *